United States Patent [19]

Yuen

[11] Patent Number: 5,692,234
[45] Date of Patent: Dec. 2, 1997

[54] CLIP-ON GLASSES/SHIELD FOR CAPS WITH BILLS

[76] Inventor: Melville Yuen, 1709 Wilhelmina Rise, Honolulu, Hi. 96816

[21] Appl. No.: 675,002

[22] Filed: Jul. 3, 1996

[51] Int. Cl.⁶ .................................................. A42B 1/06
[52] U.S. Cl. ............................. 2/10; 2/209.13; 351/155
[58] Field of Search ............................ 2/6.3, 6.5, 6.7, 2/10, 209.13, 424, 453; 351/155

[56] References Cited

U.S. PATENT DOCUMENTS

| | | |
|---|---|---|
| 4,869,586 | 9/1989 | Chung ................................. 2/10 |
| 5,208,916 | 5/1993 | Kelman .............................. 2/10 |
| 5,261,124 | 11/1993 | Day .................................... 2/10 |
| 5,347,655 | 9/1994 | Garrett ............................... 2/10 |
| 5,412,812 | 5/1995 | Gatchalian ......................... 2/10 |
| 5,533,207 | 7/1996 | Diaz ................................. 351/155 |

FOREIGN PATENT DOCUMENTS 2030546  12/1971  Germany ..................... 2/10

*Primary Examiner*—Diana Biefeld
*Attorney, Agent, or Firm*—Patent & Trademark Services, Inc.; Joseph H. McGlynn

[57] ABSTRACT

Eyewear including a clip body adapted to be attached to a bill of a cap and an eyepiece rotatably mounted to the clip body. The eyepiece may be rotated from an in use position to a flipped up storage position and intermediate positions. The eyepiece is also adjustable in a generally vertical direction with respect to the clip body via slots in the side of the eyepiece.

5 Claims, 1 Drawing Sheet

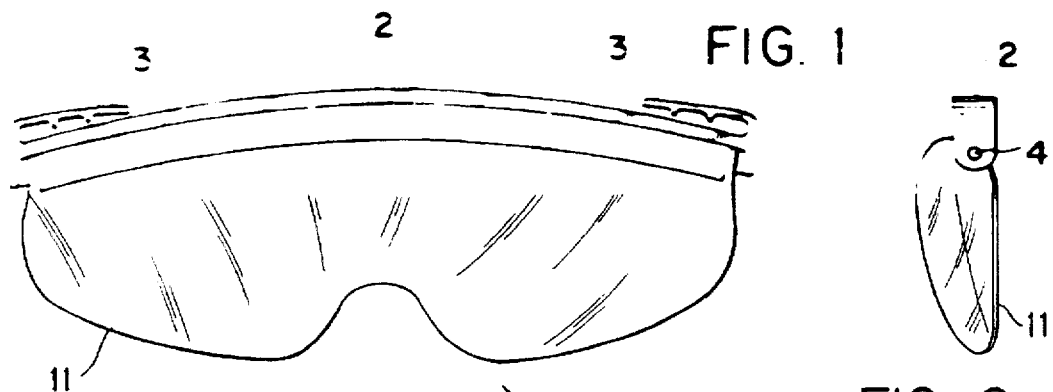
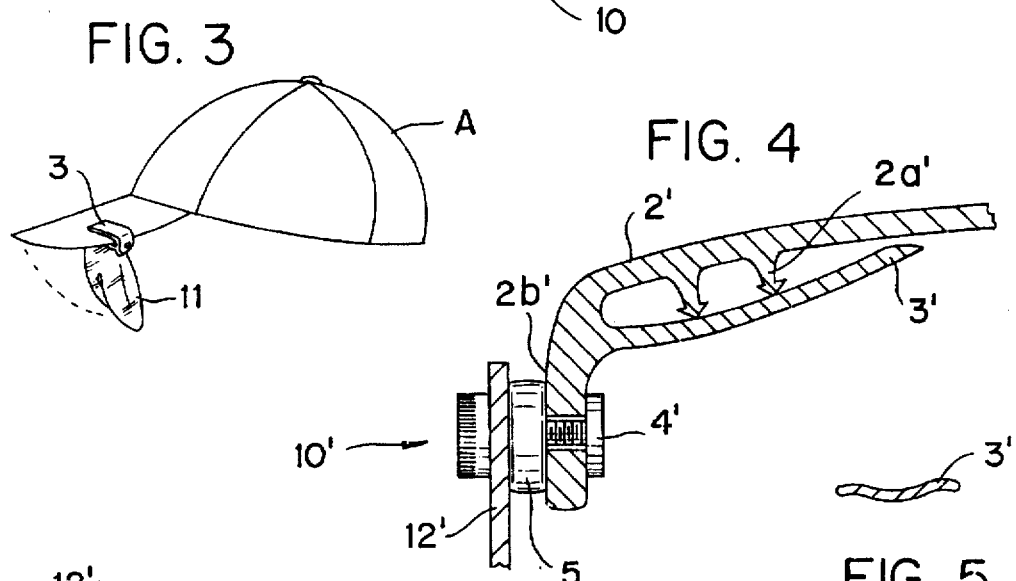
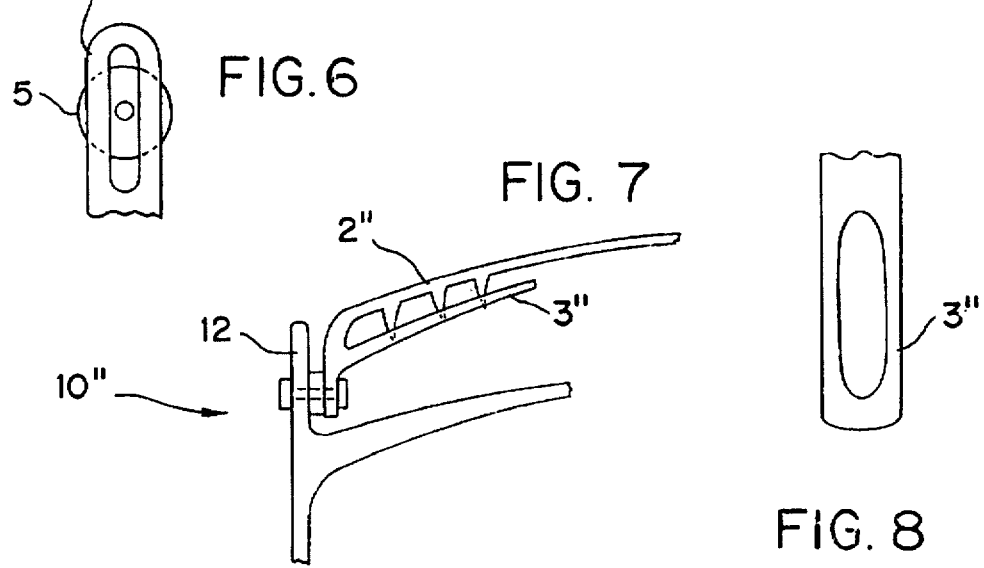

5,692,234

1

CLIP-ON GLASSES/SHIELD FOR CAPS WITH BILLS

BACKGROUND OF THE INVENTION

This invention relates, in general, to eyewear, and, in particular, to eyewear adapted to be attached to bills or visors for people wearing caps or the like with bills or visors. The generic term "eyewear" includes, but is not limited to, eyeglasses, eyepieces, face shields and goggles. The eyewear may be used for vision correction, for cosmetic appearance or for protection.

DESCRIPTION OF THE PRIOR ART

In the prior art various types of eyewear have been proposed for wearers of caps with bills or visors. For example, U.S. Pat. No. 5,412,812 discloses a detachable eyeshield attachment for visor caps or the like. The eyeshield attachment includes a clip-type mounting base removably attached to the underside rear portion of a cap visor, a pivotable eyeshield holder with an eyeshield being hingedly clipped by a base such that the holder is capable of being controllably gripped or locked in place by the action of an adjustable threaded fastener. The disadvantage of this device is that it requires a hole through the visor and an unsightly bolt and nut projecting above the visor.

U.S. Pat. No. 5,208,916 discloses a sunglass assembly for attachment to a visored headgear including a removably attached mounting bracket which clips onto the front of the visor. The bracket includes a pair of parallel mounting rails formed of a single piece of wire. A sunglass member is slidably mounted on the rails and may be rotated out of the user's line of sight. This device may be dangerous in that it requires a pair of wire rails beneath the visor which are directed towards the eyes.

U.S. Pat. No. 5,347,655 discloses eyewear in combination with a visor. The frame of the eyewear has posts which extend laterally through holes in members depending from the visor. The holes have scalloped edges which combined with prismatic shaped posts allows the sunglasses to be rotatable incrementally between an up position, a down position and several intermediate positions. This device lacks adjustability in any direction other than rotational positioning.

U.S. Pat. No. 5,261,124 discloses an eye shield assembly for a cap visor with a clip body having a slide block mounted for sliding therein and an eye shield pivotally engaged into and suspending from a holder portion of the slide block. The clip body clips onto the front of the cap visor. This device and each of the above devices of the prior art lack adjustability in the vertical direction.

Caps with visors are worn at different angles by different individuals. Thus, there is a need for eyewear attachable to a visor which is adjustable in the vertical direction in order to properly position the eyewear before the user's eyes and is rotatable and inexpensive.

SUMMARY OF THE INVENTION

The present invention is directed to eyewear adapted to be attached to bills or visors of caps or other headwear. The eyewear includes an eyepiece rotatably mounted to the sides of a clip body. The clip body including prongs and clip ends for retaining the eyewear on a bill or visor of a cap. The eyepiece including slotted sides which allow adjustment of the eyepiece in the vertical direction. The present invention is significantly different from the prior art devices in that it requires fewer and simpler parts, is easy to install and use and is economical.

It is an object of the present invention to provide detachable eyewear which is mountable on the visor of a cap or the like.

It is an object of the present invention to provide eyewear capable of being pivoted from an in use position directly in front of the user's eyes to a flipped up position and intermediate positions.

It is an object of the present invention to provide eyewear which is adjustably restrained in a desired position.

It is an object of the present invention to provide eyewear which is adjustable in a generally vertical direction.

It is an object of the present invention to provide eyewear which provides protection and comfort to the user.

It is an object of the present invention to provide eyewear which is inexpensive to produce and easy to attach to various cap visors.

These and other objects and advantages of the present invention will be fully apparent from the following description, when taken in connection with the annexed drawings.

BRIEF DESCRIPTION OF THE DRAWINGS

FIG. 1 is a frontal view of one embodiment of the present invention.

FIG. 2 is a side view of the same embodiment of the present invention.

FIG. 3 is a side view of the same embodiment of the present invention mounted on the visor of a cap in the in use position.

FIG. 4 is a frontal detail view of another embodiment of the present invention with the body of the clip on top.

FIG. 5 is a section view of the clip end of the second embodiment of the present invention.

FIG. 6 is a side detail view of the second embodiment of the present invention with the vertical adjustment slot shown.

FIG. 7 is a frontal detail view of a third embodiment of the present invention.

FIG. 8 is a top detail view of the slotted clip end of the present invention.

DESCRIPTION OF THE PREFERRED EMBODIMENT

Referring now to the drawings in greater detail, FIG. 1 shows eyewear 10 including a clip body 2 with opposed clip ends 3 and an eyepiece 11 adapted to be detachably fastened to the visor or bill of a cap which is worn on a user's head. The eyepiece 11 is pivotally mounted on the clip body 2 at pivot points 4 as shown in side view in FIG. 2. The eyepiece is capable of pivoting from an in use position to a flipped up position and intermediate positions. The eyewear is shown mounted on a cap A in FIG. 3 with the eyepiece 11 in the in use position.

A second embodiment of the present invention is shown in FIG. 4. Eyewear 10' includes a clip body 2' which extends above the visor of a cap in use and can support a heavier eyepiece such as a large face shield. The eyewear may include an eyepiece, eyeglasses, sunglasses, goggles or a face shield. The clip body 2' includes depending prongs 2a' and sides 2b' with clip ends 3'. The clip body sides 2b' include pivot points 4' about which the eyepiece pivots. The pivot points may include, but are not limited to rivets, bolts and other fasteners. The prongs may be made of metal and bonded to the clip body. Alternatively, the prongs may be molded integrally with the clip body from a plastic material. The prongs grip the bill of a cap and firmly attach the eyewear to the cap.

As shown in FIG. 4, a bolt and mating nut connect clip body side 2b' to the side 12' of eyepiece 11. A soft washer 5 may be positioned on the bolt between the eyepiece side 12' and the clip body side 2b' in order to provide increased friction to retain the eyepiece in adjusted position. The washer may not be necessary if the material of the clip and/or eyepiece provides sufficient friction. In use, the position of the eyepiece is adjusted to suit the user and the nut is hand tightened to retain the eyepiece in the desired position. FIG. 5 shows a section view of clip end 3' which is dimpled or concave in order to receive the ends of prongs 2a'. The side 12' of the eyepiece includes a slot for adjustment in the vertical direction as shown in FIG. 6.

A third embodiment of the present invention is shown in FIG. 7. eyewear 10" includes clip body 2" with slotted clip ends 3" to receive the prong ends. A slotted clip end is shown in detail in FIG. 8. Eyewear 10" includes a rivet in eyepiece side 12 at the pivot point as shown in FIG. 7. This version is cheaper and simpler since it does not require a bolt and nut. A wide flange rivet is used for the pivot points. The amount of friction at the pivot points is preset at the time of manufacture to a sufficient amount.

Although the eyewear and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. Eyewear adapted to be firmly attached to a bill of a cap comprising:

a clip body having depending sides and opposed clip ends and a plurality of prongs for detachably mounting to a bill of a cap, an eyepiece adapted to be pivotally mounted at sides thereof to said depending sides of said clip body, fasteners connecting said eyepiece to said clip body at pivot points such that said eyepiece is movable between an in use position which is directly in front of the users eyes, and a storage position disposed at an angle of approximately ninety degrees with respect to the in use position, and wherein said prongs depend from said clip body and have ends which are received within slots of said clip ends.

2. The eyewear as claimed in claim 1, wherein said fasteners include rivets.

3. The eyewear as claimed in claim 1, wherein said fasteners include bolts and mating nuts and further including soft washers disposed about said bolts between said depending sides of said clip body and said sides of said eyepiece.

4. The eyewear as claimed in claim 3 wherein said sides of said eyepiece include slots for adjustment of said eyepiece in a generally vertical direction relative to said clip body.

5. Eyewear adapted to be firmly attached to a bill of a cap comprising:

a clip body having depending sides and opposed clip ends and a plurality of prongs for detachably mounting to a bill of a cap, an eyepiece adapted to be pivotally mounted at sides thereof to said depending sides of said clip body, fasteners connecting said eyepiece to said clip body at pivot points such that said eyepiece is movable between an in use position which is directly in front of the users eyes, and a storage position disposed at an angle of approximately ninety degrees with respect to the in use position, and wherein said prongs depend from said clip body and have ends which are received within concave portions of said clip ends.

* * * * *